(12) United States Patent
Aloni (10) Patent No.: US 8,973,695 B2
(45) Date of Patent: Mar. 10, 2015

(54) VEHICLE WHEELED DEVICE

(76) Inventor: Eyal Jacob Aloni, Pardes Hanna (IL)

(\*) Notice: Subject to any disclaimer, the term of this patent is extended or adjusted under 35 U.S.C. 154(b) by 586 days.

(21) Appl. No.: 13/160,512

(22) Filed: Jun. 15, 2011

(65) Prior Publication Data

US 2011/0304117 A1    Dec. 15, 2011

Related U.S. Application Data (60) Provisional application No. 61/354,844, filed on Jun. 15, 2010.

(51) Int. Cl.
| | | |
|---|---|---|
| A63C 5/08 | (2006.01) | |
| B62D 61/06 | (2006.01) | |
| B62K 1/00 | (2006.01) | |
| B62H 7/00 | (2006.01) | |
| B62J 25/00 | (2006.01) | |
| B62K 5/08 | (2006.01) | |
| B62K 23/00 | (2006.01) | |
| B62K 5/05 | (2013.01) | |

(52) U.S. Cl.
CPC .. *B62K 1/00* (2013.01); *B62H 7/00* (2013.01); *B62J 25/00* (2013.01); *B62K 5/08* (2013.01); *B62K 23/00* (2013.01); *B62K 5/05* (2013.01); *B62K 2204/00* (2013.01)
USPC ............ 180/210; 180/180; 180/181; 180/211

(58) Field of Classification Search
USPC ......... 280/210, 220, 221, 251, 252, 253, 254, 280/255, 256, 257, 267, 282; 180/210, 211, 180/212, 213, 214, 215, 216, 217, 180, 181
See application file for complete search history.

(56) References Cited

U.S. PATENT DOCUMENTS

| | | | | |
|---|---|---|---|---|
| 2,198,857 A | | 4/1940 | Branson | |
| 3,910,368 A | * | 10/1975 | Weber et al. | 180/213 |
| 4,020,914 A | * | 5/1977 | Trautwein | 180/210 |
| 4,073,356 A | * | 2/1978 | Schlicht | 180/181 |
| 4,634,137 A | * | 1/1987 | Cocksedge | 280/256 |
| 4,740,004 A | * | 4/1988 | McMullen | 280/269 |
| 4,863,183 A | * | 9/1989 | Hwang et al. | 280/267 |
| 4,887,829 A | * | 12/1989 | Prince | 280/282 |
| 5,630,774 A | * | 5/1997 | Geschwender | 482/57 |

(Continued)

FOREIGN PATENT DOCUMENTS

| | | |
|---|---|---|
| DE | 3506026 A1 | 8/1986 |
| DE | 19515905 A1 | 10/1996 |

(Continued)

OTHER PUBLICATIONS

Retrieved from Bossbi.com website on Jun. 13, 2011: http://www.bossbi.com/boards/streetcarver/streetcarver.php.

(Continued)

*Primary Examiner* — Joseph Rocca
*Assistant Examiner* — Marc A Scharich
(74) *Attorney, Agent, or Firm* — The Law Office of Michael E. Kondoudis (57) ABSTRACT

A vehicle wheeled device has a drive wheel, two foot pads and two support wheels. The drive wheel is adapted to drive the device along a longitudinal drive path with the foot pads being located at opposing longitudinal sides of the drive wheel. The two support wheels of the device are adapted to engage the ground face at one of the longitudinal sides of the drive wheel with the drive path being located therebetween.

11 Claims, 7 Drawing Sheets

(56) References Cited

U.S. PATENT DOCUMENTS

| | | | |
|---|---|---|---|
| 6,263,990 B1* | 7/2001 | Liu | 180/65.1 |
| 6,352,274 B1* | 3/2002 | Redman | 280/248 |
| 6,705,630 B1* | 3/2004 | Karpman | 280/253 |
| 6,848,527 B2* | 2/2005 | Nelson | 180/181 |
| 7,073,806 B2* | 7/2006 | Bagnoli | 280/267 |
| 7,172,044 B2* | 2/2007 | Bouvet | 180/181 |
| 7,543,829 B1* | 6/2009 | Barnes | 280/62 |
| 7,811,217 B2* | 10/2010 | Odien | 482/147 |
| 7,887,076 B2* | 2/2011 | Adams | 280/210 |
| 8,454,045 B2* | 6/2013 | Kettler et al. | 280/291 |
| 2001/0042968 A1* | 11/2001 | Andrews et al. | 280/220 |
| 2004/0144586 A1* | 7/2004 | Trott | 180/213 |
| 2005/0241864 A1 | 11/2005 | Hiramatsu | |
| 2006/0097471 A1* | 5/2006 | Van Den Brink et al. | 280/124.103 |
| 2007/0209854 A1* | 9/2007 | Ho | 180/210 |
| 2009/0256324 A1* | 10/2009 | Lake et al. | 280/87.042 |
| 2010/0230924 A1* | 9/2010 | Kraus | 280/210 |

FOREIGN PATENT DOCUMENTS

| | | |
|---|---|---|
| FR | 2862231 A1 | 5/2005 |
| GB | 312796 | 6/1929 |
| NL | 1019905 | 8/2003 |
| WO | 2005100139 | 10/2005 |
| WO | 2005100139 A1 | 10/2005 |

OTHER PUBLICATIONS

BOSSBi, Street Carver BMW 5 Technology Series at Your Feet, retrieved from http://bossbi.com/boards/streetcarver/streetcarver.php., Oct. 2, 2014, pp. 1 and 2, USA.

* cited by examiner

VEHICLE WHEELED DEVICE

CROSS REFERENCES TO RELATED APPLICATIONS

The present application claims benefit under 35 U.S.C. §119(e) of U.S. Provisional Application 61/354,844 filed Jun. 15, 2010, the entire content of which is incorporated herein by reference.

TECHNICAL FIELD

Embodiments of the invention relate to a vehicle wheeled device that is stabilized about a single driving wheel.

BACKGROUND

Vehicle wheeled devices such as unicycles are statically unstable in all directions and thereby require dynamic balancing during riding. Two wheeled vehicle devices such as bicycles or motorcycles are statically stable in the axial direction of their advance but require balance from the rider mainly in the lateral direction. Four wheeled vehicle devices are statically stable in both the lateral and axial direction and thereby do not require balancing at all.

Vehicle wheeled devices may in some cases include means that assist in the stabilizing of and balancing of the device. Such means may be in the form of additional wheels that engage the ground when the device is un-balanced, or in more complex cases computerized controllers that in return to signals received from sensors control the balance of the device.

PCT Patent publication No. 2005100139 describes a foot-propelled wheeled device which has a wheel situated between two side-plates suspended on the axle of the wheel. Foot-boards that are situated below the axle of the wheel are connected to the side-plates and at a certain distance behind the wheel there is a structure for ensuring stabilization against tilting.

US patent publication No. 2005241864 describes a motorized vehicle that has a plate-like main body with front and rear side support plates and a wheel that is arranged on the bottom surface of the main body. The wheel preferably includes a motor, and a drive controller is preferably embedded in the main body for receiving signals from sensors that are located in the vehicle in order to control the motor and thereby help balance a user riding the vehicle.

U.S. Pat. No. 4,657,272 describes a wheeled vehicle comprising a unicycle-like device. The device employs a single large drive wheel, a pair of pedals, a seat, and a pair of forks to support the seat and attached to the rear of the device is an additional set of support wheels. The support wheels are attached to the device in such a manner that they track through turns as the drive wheel is turned to the right or left and under normal conditions the support wheels remain on the ground at all times to provide the rider with additional longitudinal stability without adding a significant increment of lateral stability.

SUMMARY

The following embodiments and aspects thereof are described and illustrated in conjunction with systems, tools and methods which are meant to be exemplary and illustrative, not limiting in scope.

In an embodiment a vehicle wheeled device comprises a drive wheel, two foot pads and two support wheels, the drive wheel is adapted to rotate about a rotational axis and engage a ground face in order to facilitate movement of the device along a longitudinal drive path, the foot pads are located at opposing longitudinal sides of the drive wheel and the two support wheels are adapted to engage the ground face at a given one of the longitudinal sides of the drive wheel with the drive path being located therebetween.

In an embodiment, a rider is adapted to ride the device while standing with one foot on one of the foot pads and the other foot on the other foot pad, and by shifting his weight longitudinally away from the support wheels the rider is adapted at least at some point to lift the support wheels from engagement with the ground face.

Optionally, the device comprises a body for rotatably supporting the drive wheel and at least when the ground face is planar and during engagement of the drive and support wheels with the ground face, any tilt of the drive wheel in relation to the ground face will urge the support wheels to be steered.

Typically, the drive path divides the ground face into two lateral sides and the tilting of the drive wheel in relation to the ground face is towards one of the lateral sides.

Optionally, the steering includes rotation of each support wheel about a respective auxiliary axis that is perpendicular to ground face.

Typically, the rotation of each given support wheel about its auxiliary axis is such that the support wheels are steered towards the same lateral side of the ground face towards which the drive wheel was tilted.

Optionally, the device has a steering mechanism for steering the support wheels, the steering mechanism comprising a shaft and two arms, the shaft comprising an effective center and two side segments located on opposing sides of the center, each arm extending between an associated one of the side segments and an associated one of the support wheels and being adapted to rotate about an axis passing through and along its associated side segment, and the shaft being adapted to pivot about a steering axis that extends in a direction away from the drive wheel to intersect the ground face at, or distal to where, the support wheels engage the ground face.

Optionally, the steering axis passes through the effective center of the shaft.

Optionally, the steering axis passes above the effective center of the shaft.

Optionally, said tilting is performed about a neutral axis that passes below both foot pads.

Optionally, the neutral axis passing below both foot pads passes through a first region where the drive wheel engages the ground face and a second region that is located between the foot pad adjacent the support wheels and the ground face.

Optionally, the device comprises a handle that is fitted to be held by the rider that rides the device, said handle being coupled to the body of the device at a position above the neutral axis and by pulling the handle the rider can force the drive wheel to be tilted about the neutral axis in the same direction towards which he leans.

Typically, the device comprises a steering mechanism that is adapted to steer the support wheels.

Optionally, the steering mechanism is at an initial centered state when the drive wheel is not tilted in relation to the ground face and the device comprises a biasing means that is adapted to urge the support wheels towards the initial centered state.

Typically, the device comprises a body rotatably supporting the drive wheel and being adapted to be tilted together with the drive wheel, the device further comprising a steering mechanism adapted to steer the support wheels that comprises a part coupled to the support wheels that is adapted to move in relation to the body upon steering of the support wheels.

Optionally, the device comprises a damper that is fixedly coupled to the part of the steering mechanism and to the body of the device, and said damper is adapted to resist relative movement between the part and the body.

Further optionally, the resistance of the damper is adapted to increase in proportion to increase in velocity of movement of the part of the steering mechanism relative to the body.

If desired, the steering mechanism comprises a bridge, the bridge being rigidly fixed at a lower end to the effective center of the shaft and being pivotally coupled at an upper end to the body, and the steering axis passing through the upper end.

In an embodiment a vehicle wheeled device also comprises two foot pads, a steering mechanism, a drive wheel and a body for rotatably supporting the drive wheel, the drive wheel when engaging a ground face and upon rotation being adapted to facilitate movement of the device along a longitudinal drive path, the foot pads being located at opposing longitudinal sides of the drive wheel, and the steering mechanism comprising two support wheels, a shaft and two arms, each arm being pivotally coupled to a given one of the ends of the shaft and extending therefrom to a given one of the support wheels, the shaft being adapted to pivot about a steering axis that extends in a direction away from the drive wheel to intersect the ground face at, or distal to where, the support wheels engage the ground face, wherein the drive path divides the ground face into two lateral sides that are located at opposing sides of the drive path and at least when the ground face is planar and during engagement of the drive and support wheels with the ground face, any tilt of the drive wheel and body relative to the ground face to a given lateral side will urge the support wheels to be steered towards that given lateral side.

Optionally, the steering mechanism comprises a bridge, the bridge being rigidly fixed at a lower end to a center of the shaft and being pivotally coupled at an upper end to the body, and the steering axis passes through the upper end of the bridge.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1:
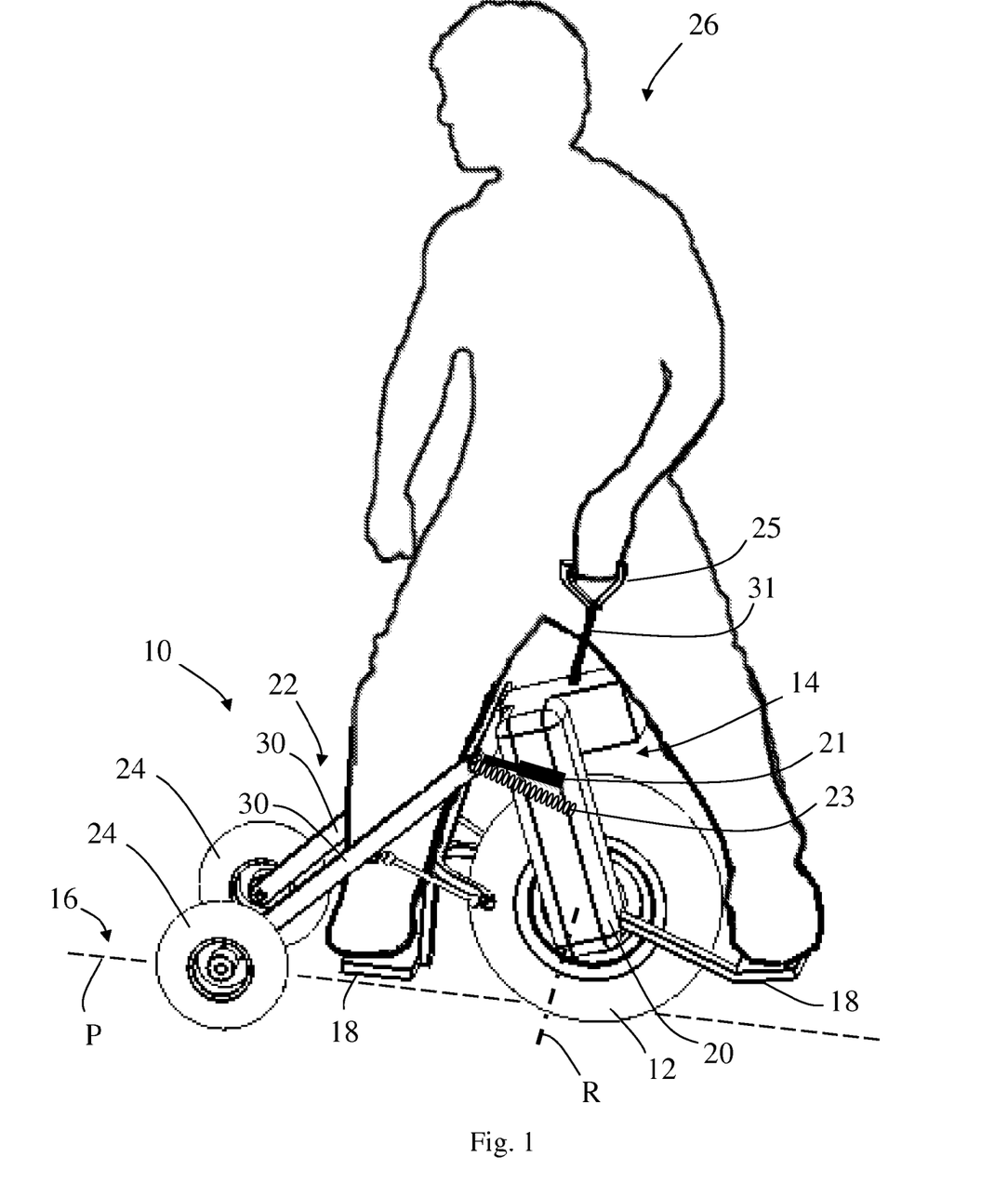
FIG. 1 schematically shows a perspective top view of a rider riding a vehicle wheeled device in accordance with an embodiment of the present invention.
Figure 2:
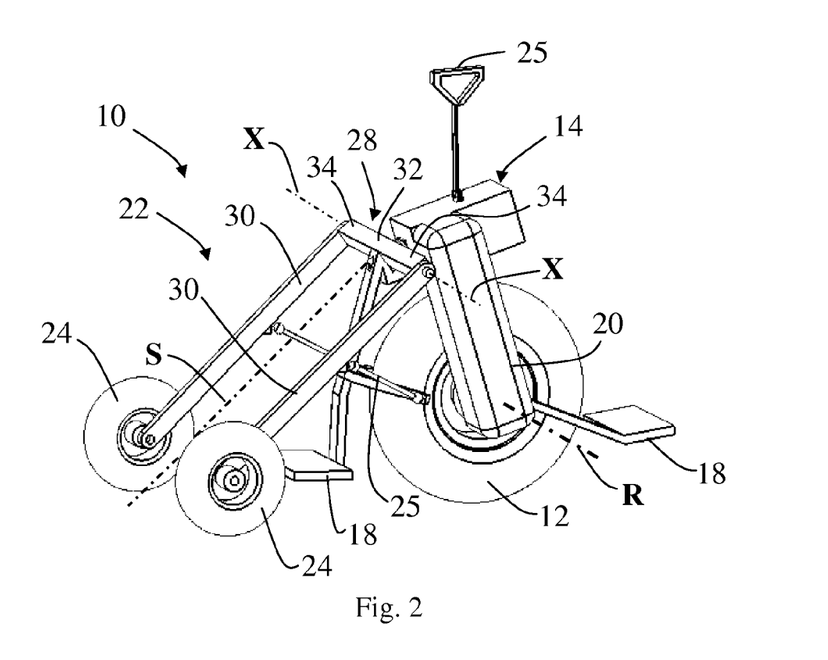
FIG. 2 schematically shows a perspective top view of the vehicle wheeled device.

Attention is first drawn to FIG. 1. A vehicle wheeled device 10 in accordance with an embodiment of the present invention has a drive wheel 12 and a body 14 for supporting rotation of the drive wheel 12 about an axis of rotation R. The drive wheel 12 when engaging a ground face 16 is adapted upon rotation to urge movement of the device 10 along a longitudinal drive path P. Body 14 includes two foot pads 18 that are located at opposing longitudinal sides of the drive wheel 12 and an optional motor 20 for urging rotation to the drive wheel 12. It is noted that drive wheel 12 is located between both foot pads 18.

The vehicle wheeled device 10 has also a steering mechanism 22 with two support wheels 24 that are adapted to engage the ground face 16 at a given one of the longitudinal sides of the drive wheel 12 with the drive path P being located therebetween. A rider 26 riding the device 10 may shift his weight towards the opposite longitudinal side of the drive wheel 12 that is distal of the support wheels 24 in order to detach and lift the support wheels 24 from the ground face 16 and experience a unicycle single wheel driving experience on only the drive wheel 12.

The device 10 has a handle 25 that is attached to the body 14 of the device 10 by an optional flexible cord 31 and the handle 25 optionally includes means such as a throttle and/or a brake for controlling the speed of the device 10. The rider 26 may hold onto the handle 25 and pull it upwardly in order to urge himself to bear upon the device 10 with his feet at the foot pads 18 to thereby increase his control when riding the device 10. It should be noted that directional terms appearing throughout the specification and claims, e.g. "forward", "rear", "up", "down" etc., (and derivatives thereof) are for illustrative purposes only, and are not intended to limit the scope of the appended claims. In addition it is noted that the longitudinal drive path P defines a directional term that may be associated with the forward and rear directions and the directional terms "down", "below" and "lower" (and derivatives thereof) define identical directions.

Figure 3:
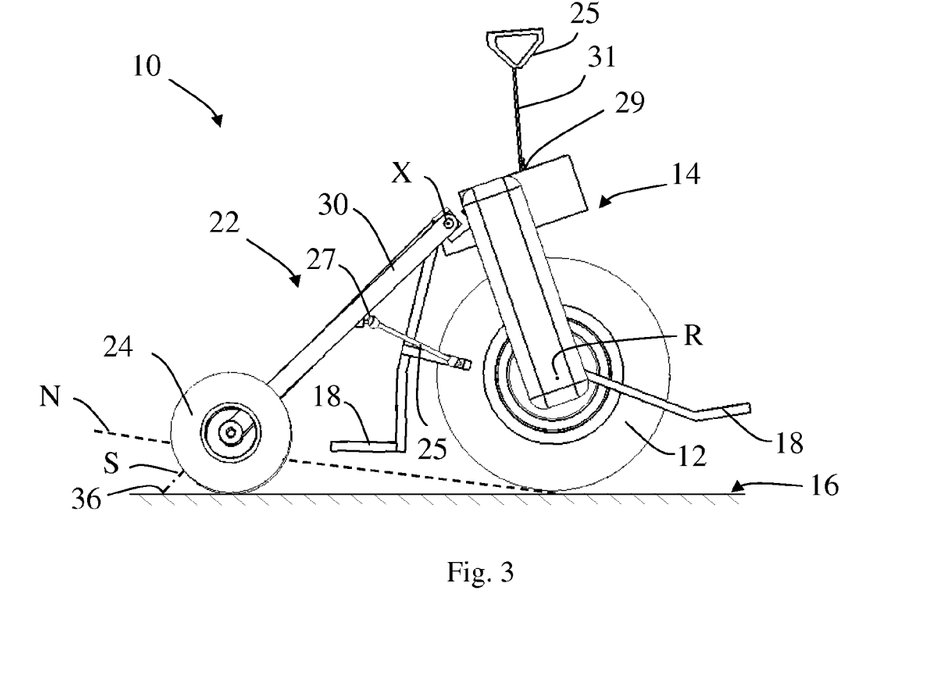
FIG. 3 schematically shows a lateral side view of the vehicle wheeled device.
Figure 4:
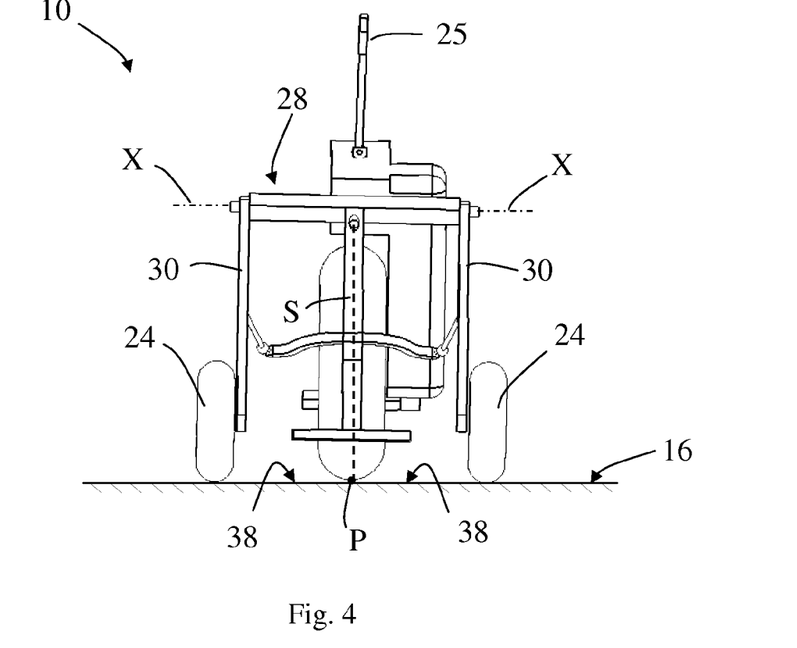
FIG. 4 schematically shows a front view of the vehicle wheeled device.
Figure 5:
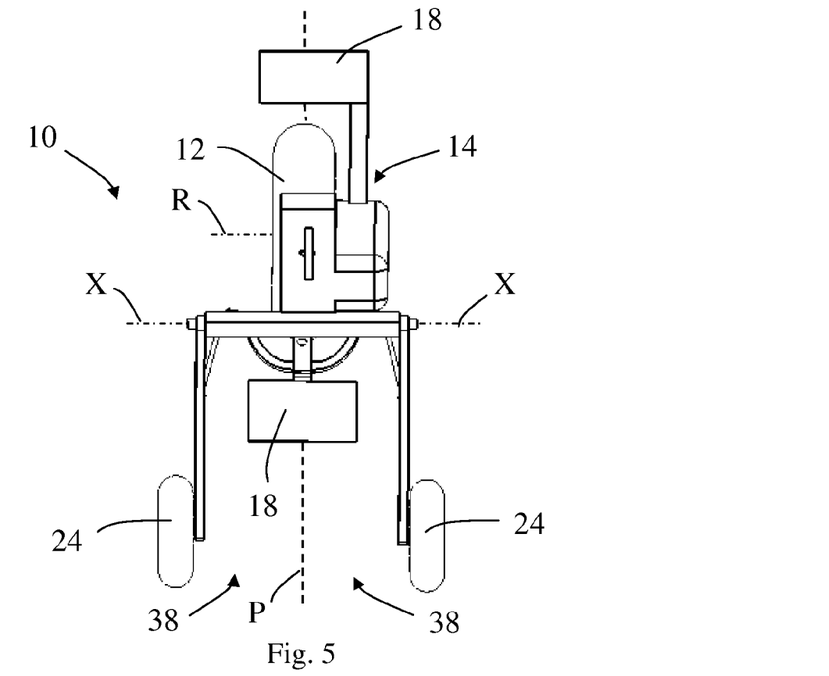
FIG. 5 schematically shows a top view of the vehicle wheeled device.

Attention is now additionally drawn to FIGS. 2 to 5 where it is seen that at least when placed upon a flat planar ground face 16 and when no tilting is imposed upon the drive wheel 12 and body 14, the steering mechanism 22 is at an initial centered state where both of its support wheels 24 (as best seen in FIGS. 4 and 5) are similarly and symmetrically located at both sides of the drive path P with one support wheel 24 being generally parallel to the other wheel 24 and both support wheels 24 being adapted to support motion of the device along a straight drive path P.

The steering mechanism 22 has a shaft 28 and two arms 30. The shaft 28 has an effective center 32 and two side segments 34 that are located at opposing sides of center 32. Both segments 34 optionally extend away from the center 32 an equal distance. Each arm 30 extends between an associated one of the side segments 34 of shaft 28 and an associated one of the support wheels 24. The steering mechanism 22 has in addition two rods 25. Each rod 25 is coupled at one end to the body 14 of the device 10 and at its other end to a respective one of the arms 30 at an anchoring point 27. The anchoring points 27 on the arms 30 are adapted by virtue of the rods 25 to remain at a generally fixed position in relation to the body 14 of the device 10 as the body 14 is tilted. Each arm 30 is adapted to rotate about an axis X that passes through and along its associated side segment 34 and each arm 30 extends away from its side segment 34 in a direction transverse to axis X of its side segment 34. It is noted that each arm 30, as it rotates about axis X of its associated side segment 34, also pivots about its anchoring point 27. Side segments 34 in device 10 of this embodiment extend linearly relative to each other and form an integral part of shaft 28, and therefore axis X may also be defined as extending through shaft 28.

Shaft 28 is this embodiment of device 10 is pivotally coupled to body 14 at its effective center 32 and is adapted to rotate about a steering axis S that perpendicularly passes through its effective center 32. Therefore in this embodiment, axis X can be defined as being normal to an imaginary plane (not shown) in which axis S lies. Steering axis S in this embodiment accordingly perpendicularly intersects axis X and extends from effective center 32 in a direction away from the drive wheel 12 and towards support wheels 24.

Steering axis S intersects ground face 16 at a point 36 that is located at, or distal to, the region where support wheels 24 engage ground face 16. It is noted that above defined position of point 36 relative to the support wheels 24 is chosen such in order to impart a self centering characteristic to steering mechanism 22. This self centering characteristic assists to urge the support wheels 24 to straighten and thereby the steering mechanism 22 to return towards its initial centered state when the device 10 is for example ridden with the support wheels 24 leading.

The drive path P along which the device 10 is adapted to progress when being ridden divides the ground face 16 into two lateral sides 38 (lateral sides 38 are indicated in FIG. 4). Steering mechanism 22 is adapted to steer the support wheels 24 when the drive wheel 12 (together with body 14) is tilted to one of the lateral sides 38. When riding the device 10 for example with the support wheels 24 leading, the steering mechanism 22 is adapted to create steering of the support wheels 24 in the direction to which the rider 26 leans in order to support turning of the device 10 in that direction.

As can be seen in FIG. 3, tilting of body 14 is designed to occur about a neutral axis N that passes below both foot pads 18 of the device 10. Neutral axis N extends optionally through a first region where the drive wheel 12 engages ground face 16 and a second region that is located between the foot pad 18 that is adjacent the support wheels 24 and the ground face 16. Such an axis N that passes below both foot pads 18 ensures that both foot pads 18 are tilted to the same lateral side 38 towards which body 14 of device 10 is tilted and the rider 26 leans.

Tilting of device 10 about such an axis N has been found by the inventor to impart to the device a more predictable and controllable steering as the rider 26 with his full-body is tilted to the same lateral side to which the device 10 turns. If for example, axis N where to pass above a given one of the foot pads 18, the rider 26 when leaning to a given lateral side 38 to take a turn would undergo an unpredictable experience as his foot that is placed upon the given foot pad 18 is tilted to the opposing lateral side 38 thus forming a side force that enhances the steering of the device 10.

Attention is now drawn to FIGS. 6 to 9. When the rider 26 tilts body 14 of device 10 by leaning towards a given lateral side 38, the arms 30 and the shaft 28 of the steering mechanism 22 are rotated each about its respective axis X, S in order to adjust the orientation of each support wheel 24 to the ground face 16 upon which it is placed. This adjustment of orientation of each support wheel 24 results in a steering maneuver that is imparted to each support wheel 24.

At least when ridden upon a straight planar ground face 16, tilting of the drive wheel 12 and body 14 of device 10 towards a given lateral side 38 will result in a steering maneuver that is imparted to each given support wheel 24 that includes, inter alia, rotation and/or tilting of the support wheel 24 relative to an auxiliary axis Z that is perpendicular to the ground face 16. Such rotation and/or tilting being towards the same given lateral side 38.

Figure 6:
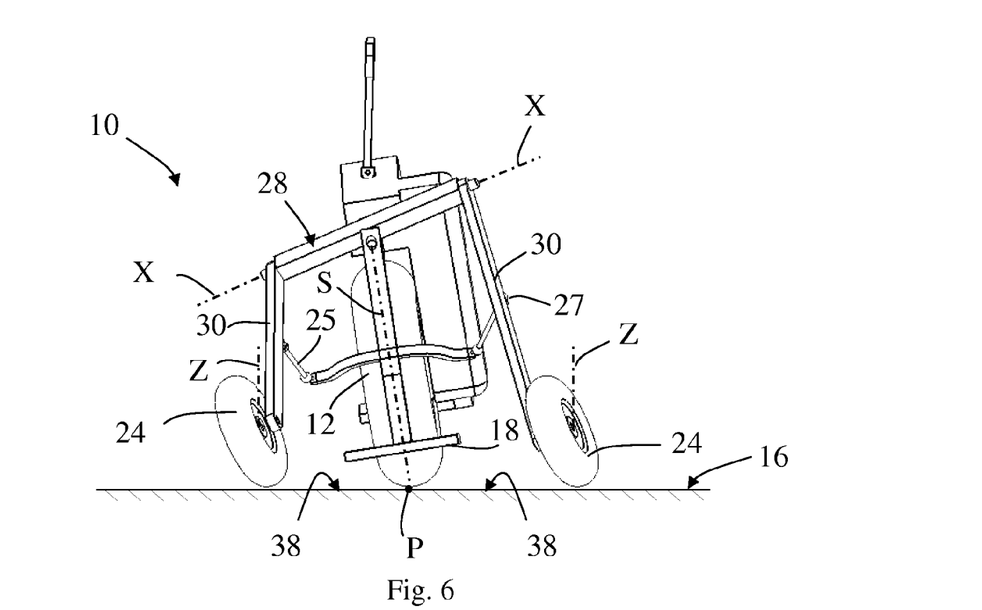
FIG. 6 schematically shows a front view of the vehicle wheeled device when making a turn to one of its lateral sides.
Figure 7:
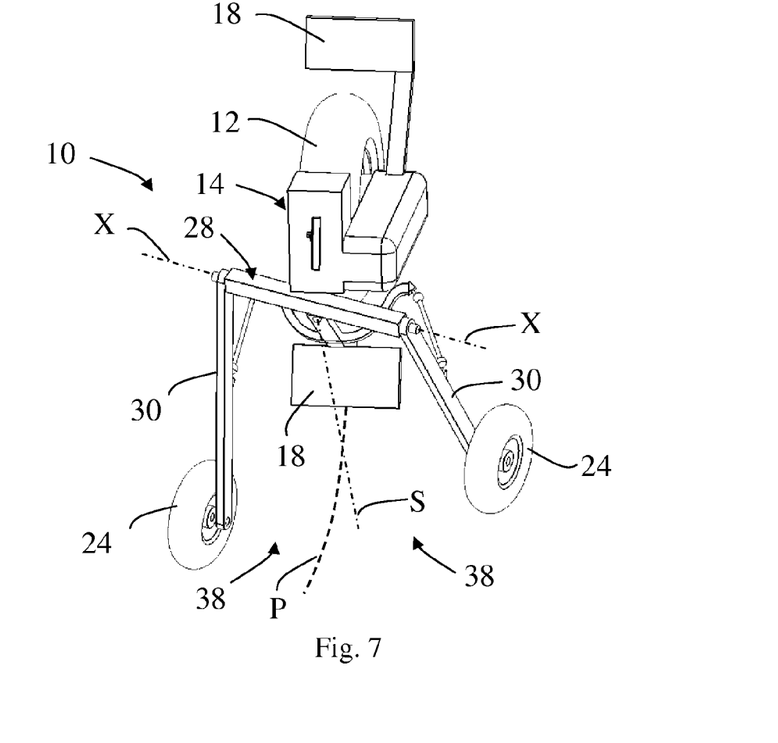
FIG. 7 schematically shows the vehicle wheeled device shown in FIG. 6 from a top view.
Figure 8:
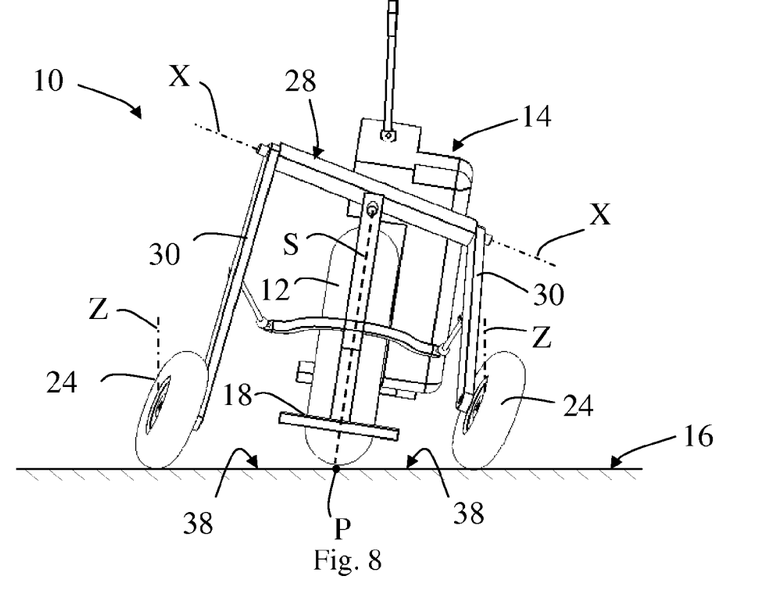
FIG. 8 schematically shows a front view of the vehicle wheeled device when making a turn to its other opposing lateral side.
Figure 9:
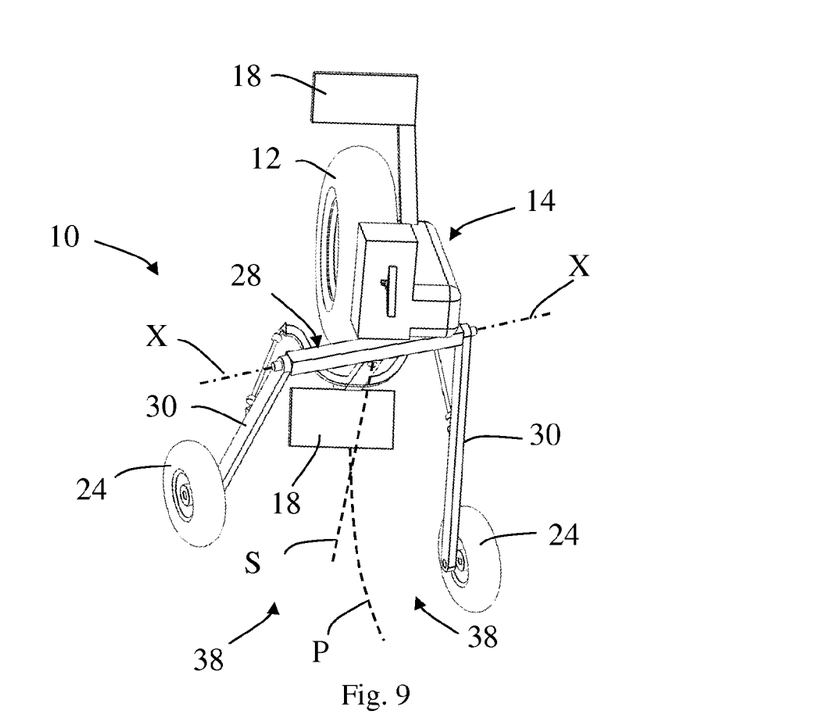
FIG. 9 schematically shows the vehicle wheeled device shown in FIG. 8 from a top view.

The vehicle wheeled device 10 in FIGS. 6 and 7 is shown tilted towards one lateral side 38 with the support wheels 24 being steered towards that lateral side 38 and the vehicle wheeled device 10 in FIGS. 8 and 9 is shown tilted towards the other opposing lateral side 38 with the support wheels 24 being steered towards that opposing lateral side 38.

Attention is drawn back to FIG. 1. In an embodiment, the steering mechanism 22 may optionally include two biasing means in the form of springs 23 and one damper 21 (in FIG. 1 only one of the springs 23 at the near side of the device 10 can be seen). Each spring 23 is optionally coupled between a respective side of the shaft 28 of the steering mechanism 22 and the body 14 of the device 10 and the two springs 23 are adapted to urge the steering mechanism 22 back towards its initial centered state in the event that a steering maneuver is performed. Such biasing means may assist the rider to return the device 10 to a non tilted and non-steered state when for example the device 10 is not in motion or is ridden at a relatively slow speed.

Damper 21 is optionally coupled between one of the sides of shaft 28 and the body 14 of device 10 and is adapted to resist relative motion between the shaft 28 and body 14. Such resistance to motion is adapted to increase in proportion to increase in the velocity of change in the orientation of the shaft 28 relative to the body 14 and thereby damper 21 is adapted to resist and damp steering changes by preventing fast movements and oscillations in the steering mechanism 22 which in turn increase the ability of the rider 16 to control device 10.

In an embodiment, the device 10 may include a secondary supporting means (not shown) that is located at the longitudinal side of the device 10 that is opposite the longitudinal side where the steering mechanism 22 is located. The supporting means may be in the form of a caster wheel or two support wheels that can engage the ground at opposing sides of the drive path P (etc.); and such supporting means may be adapted to engage the ground face optionally only after the rider 26 has pivoted the device 10 longitudinally about the driving wheel 12 by shifting his weight longitudinally and distally away from the steering mechanism 22 to lift the support wheels 24 from engagement with the ground face 16. Such a secondary supporting means may assist in the balancing and steering of the device 10 when driving for example on a straight surface like a paved road.

Attention is drawn back to FIG. 3. In an embodiment, handle 25 of device 10 is optionally coupled to body 14 at a merge 29 that is located at a position above neutral axis N. The rider 26 when wishing to turn device 10 towards a given lateral side 38 may pull handle 25 towards the given lateral side to form a moment of force that urges the device 10 to tilt about the neutral axis N towards that given lateral side to which the device 10 turns.

Attention is now drawn to FIGS. 10 to 13. In an embodiment of a device 10 that is generally similar device 10 described above, the steering mechanism 22 differs in that it is coupled to body 14 via a bridge 40. Bridge 40 is rigidly fixed at its lower end to effective center 32 of shaft 28 and is pivotally coupled at its upper end to body 14 at a location above shaft 28. As a result, steering axis S in this embodiment extends above shaft 28 through the upper end of bridge 40 and does not intersect axis X about which arms 30 are pivoted when device 10 is tilted and steered. Therefore also in this embodiment, axis X can be defined as being normal to an imaginary plane (not shown) in which axis S lies.

Figure 10:
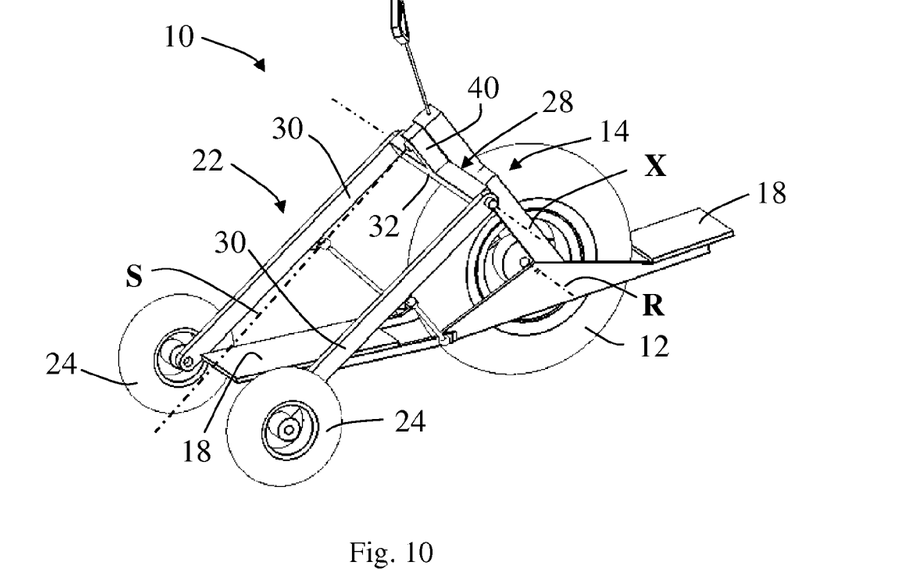
FIG. 10 schematically shows a perspective top view of a vehicle wheeled device in accordance with another embodiment of the present invention.
Figure 11:
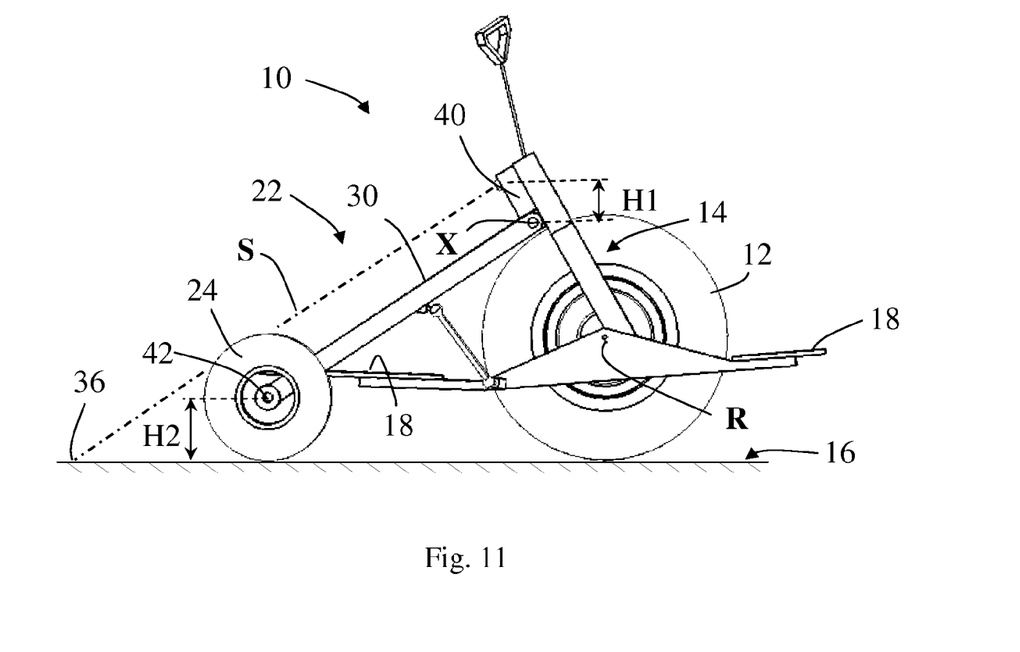
FIG. 11 schematically shows a lateral side view of the vehicle wheeled device of FIG. 10.

The following dimensions as measured along directions perpendicular to ground face 16 will now be defined with respect to device 10 when it is not tilted and when its steering mechanism 22 is at its initial centered state (FIGS. 10, 11). A projected distance between the upper and lower ends of bridge 40 is equal to H1 and a height of a lower end 42 of each arm 30 where it is coupled to a support wheel 24 is equal to H2 (H2 being also the radius of the support wheels).

Figure 12:
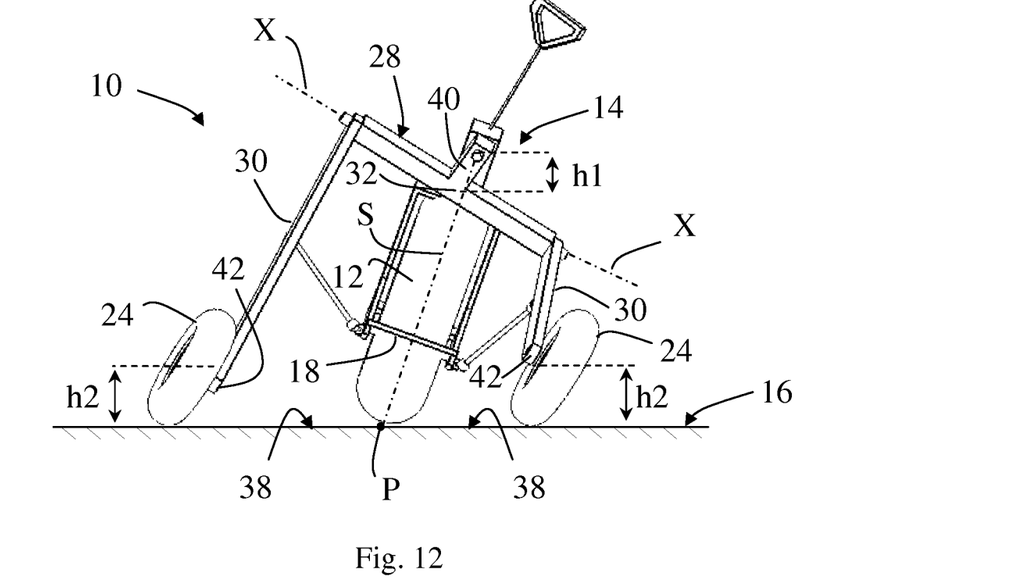
FIG. 12 schematically shows a front view of the vehicle wheeled device of FIG. 10 when making a turn to one of its lateral sides.
Figure 13:
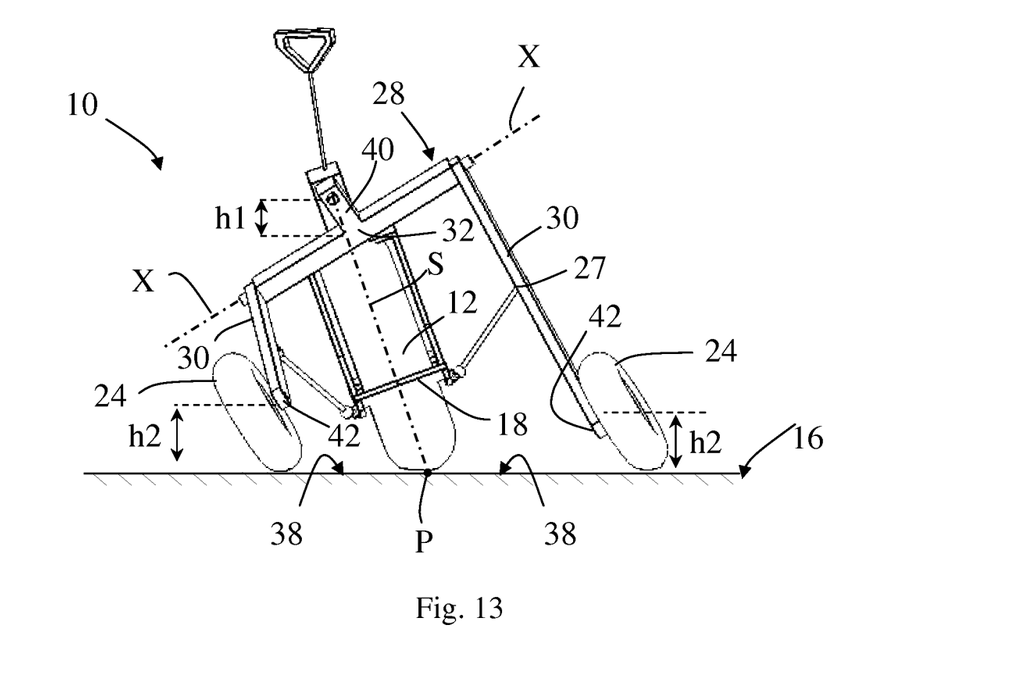
FIG. 13 schematically shows a front view of the vehicle wheeled device of FIG. 10 when making a turn to its other opposing lateral side.

The lowering of shaft 28 relative to axis S by bridge 40, has been found by the inventor impart to device 10 a "smoother" steering. This "smoother" steering may be defined at least in part by the fact that the heights of foot pads 18 relative to ground face 16 are "balanced" when device 10 is steered between different tilted states. As seen in FIGS. 12 and 13, the tilting of device 10 is accompanied also by the tilting of support wheels 24 relative to ground face 16. Therefore, as such tilting is increased; the lower ends 42 of arms 30 become closer to ground face 16 and assume heights h2 which are smaller than height H2 that existed when device 10 was not tilted. This decrease in height of the lower ends 42 of arms 30 when taken alone may have an effect that urges the foot pad adjacent support wheels 24 closer to ground face 16 and the other foot pad away from the ground face.

Bridge 40 that also tilts relative to ground face 16 when device 10 is steered, has a "balancing" affect on the relative heights of foot pads 18 as it urges the effective center 32 of shaft 28 to rise upwards as the tilting of device 10 is increased. As a result, the projected distance between the upper and lower ends of bridge 40 assumes values h1 which are smaller than value H1 that existed when device 10 was not tilted. This rise of center 32 when taken alone may have an effect that urges the foot pad adjacent support wheels 24 away from ground face 16 and the other foot pad closer to the ground face.

Therefore by taking both affects in combination (i.e. the decrease of H1 to h1 and H2 to h2) the inventor has managed to "balance" the heights of the foot pads so that a rider riding the device and taking a turn will not be exposed to substantial differences in their heights. Such "balancing" accordingly "smoothens" the steering of device 10 and increases the ability of the rider to control and maneuver the device 10.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiment has been described to a certain degree of particularity, it should be understood that various alterations and modifications could be made without departing from the scope of the invention as hereinafter claimed.

The invention claimed is:

1. A vehicle wheeled device comprising a single drive wheel, two foot pads and two support wheels, the drive wheel being adapted to rotate about a rotational axis and engage a ground face in order to facilitate movement of the device along a longitudinal drive path, the foot pads being located at opposing longitudinal sides of the drive wheel and the two support wheels being adapted to engage the ground face at one of the longitudinal sides of the drive wheel with the drive path being located between the support wheels, the device further comprising:

a body for rotatably supporting the drive wheel, wherein at least when the ground face is planar and during engagement of the drive wheel and the support wheels with the ground face, any tilting of the drive wheel and body in relation to the ground face will urge the support wheels to be steered; and a steering mechanism for steering the sup sort wheels the steering mechanism comprising a shaft and two arms, the shaft comprising an effective center and two side segments located on opposing sides of the effective center of the shaft each arm extending between a respective one of the side segments and a respective one of the support wheels and being adapted to pivot about an axis passing through and longitudinally along its respective side segment, and the shaft being adapted to rotate about a steering axis that extends in a direction distally away from the drive wheel to intersect the ground face at, or distal to where, the support wheels engage the ground face, wherein a rider is adapted to ride the device while standing with one foot on one of the foot pads and the other foot on the other foot pad, and wherein by shifting his weight longitudinally away from the support wheels the rider is adapted to lift the support wheels from engagement with the ground face, wherein the drive path divides the ground face into two lateral sides that are located at opposing sides of the drive path and the tilting of the drive wheel and body in relation to the ground face is towards one of the lateral sides.

2. The vehicle wheeled device according to claim 1, wherein the steering mechanism further comprises a part coupled to the support wheels that is adapted to move in relation to the body upon steering of the support wheels.

3. The vehicle wheeled device according to claim 2, further comprising a damper that is fixedly coupled to the part of the steering mechanism and to the body of the device, and said damper is adapted to resist relative movement between the part and the body.

4. The vehicle wheeled device according to claim 1, wherein the steering includes rotation of each support wheel about a respective auxiliary axis that is perpendicular to the ground face.

5. The vehicle wheeled device according to claim 4, wherein the rotation of each support wheel about its auxiliary axis is such that the support wheels are steered towards the same lateral side of the ground face towards which the drive wheel and body was tilted.

6. The vehicle wheeled device according to claim 1, wherein said tilting is performed about a neutral axis that passes below both foot pads.

7. The vehicle wheeled device according to claim 6, wherein the neutral axis passing below both foot pads passes through a first region where the drive wheel engages the ground face and a second region that is located between the foot pad adjacent the support wheels and the ground face.

8. The vehicle wheeled device according to claim 6, further comprising a handle configured to be held by the rider riding the device, said handle being coupled to the body of the device at a position above the neutral axis.

9. The vehicle wheeled device according to claim 1, wherein the steering axis passes perpendicularly through the effective center of the shaft.

10. The vehicle wheeled device according to claim 1, wherein the steering mechanism is at an initial centered state when the drive wheel and body are not tilted in relation to the ground face and the device further comprises a biasing means that is adapted to urge the support wheels towards the initial centered state.

11. A vehicle wheeled device comprising two foot pads, a steering mechanism, a drive wheel and a body for rotatably supporting the drive wheel, the drive wheel for engaging a ground face and being rotatable to facilitate movement of the device along a longitudinal drive path, the foot pads being located at opposing longitudinal sides of the drive wheel with the drive wheel being located therebetween, and the steering mechanism comprising a shaft, two arms and two support wheels with the drive path passing between the support wheels when the support wheels engage the ground face, each arm being pivotally coupled to a respective ends of the shaft and extending therefrom to a respective one of the support wheels, the shaft being adapted to pivot about a steering axis that extends in a direction away from the body to intersect the ground face at, or distal to where, the support wheels engage the ground face; and an axis extending along the shaft being normal to the steering axis, wherein the drive path divides the ground face into two lateral sides that are located at opposing sides of the drive path and at least when the ground face is planar and during engagement of the drive wheel and the support wheels with the ground face, any tilting of the drive wheel and body relative to the ground face to one of the lateral sides will urge the support wheels to be steered towards that one lateral side.

* * * * *